United States Patent [19]

Beecher

[11] 4,382,916
[45] May 10, 1983

[54] METHOD OF PREPARING HYDROCHLORIC ACID AND HIGH PURITY FERROUS SULFATE HYDRATE CRYSTALS FROM HYDROCHLORIC ACID WASTE PICKLE LIQUOR

[75] Inventor: Brazier K. Beecher, Wyandotte, Mich.

[73] Assignee: Voss Steel Corporation, Taylor, Mich.

[21] Appl. No.: 309,284

[22] Filed: Oct. 7, 1981

[51] Int. Cl.$^3$ .................... C01B 7/08; C01G 49/14
[52] U.S. Cl. .................................. 423/481; 423/488; 423/558
[58] Field of Search ......... 423/481, 488, 558, DIG. 1; 203/12, 25; 134/12, 13

[56] References Cited

U.S. PATENT DOCUMENTS 2,880,062  3/1959  Francis ........................... 423/558 X
4,055,631  10/1977 McGauley et al. ................ 423/558
4,222,997  9/1980  Beecher ......................... 423/558 X Primary Examiner—Earl C. Thomas
Attorney, Agent, or Firm—Cullen, Sloman, Cantor, Grauer, Scott & Rutherford

[57] ABSTRACT

A method of recovering a wide range of hydrochloric acid concentrations and high quality ferrous sulfate by-product in several hydrate forms from waste pickle liquor containing ferrous chloride. The waste pickle liquor is concentrated in a concentrator crystallizer by boiling off water and free hydrogen chloride until ferrous chloride precipitates as a crystalline hydrate. Water and hydrogen chloride vapors from the concentrator crystallizer are directed to an acid vapor fractionator which produces an overhead line of substantially pure water that is condensed and discharged into a storage tank for subsequent use. Relatively weak hydrochloric acid from the bottom liquor in the fractionator is bled off and stored or mixed with stronger acid product formed at another stage of the process. The hydrate crystals of ferrous chloride are fed to a reactor where sulfuric acid is added to react with the ferrous chloride crystals thereby forming hydrogen chloride and ferrous sulfate monohydrate. Water and hydrogen chloride vapors from the reactor are discharged and condensed for producing the strong acid product. When the strong acid from the reactor is mixed with the fractionator bottoms, the resulting mixture is controlled to yield any one of several desired concentrations. A high quality ferrous sulfate by-product is produced as a result of at least two crystallizations occurring in the concentrator crystallizer and reactor, respectively. Even higher hydrates of ferrous sulfate may be produced by recrystallizing the ferrous sulfate monohydrate from the reactor thereby further improving the quality of the ferrous sulfate product.

11 Claims, 1 Drawing Figure

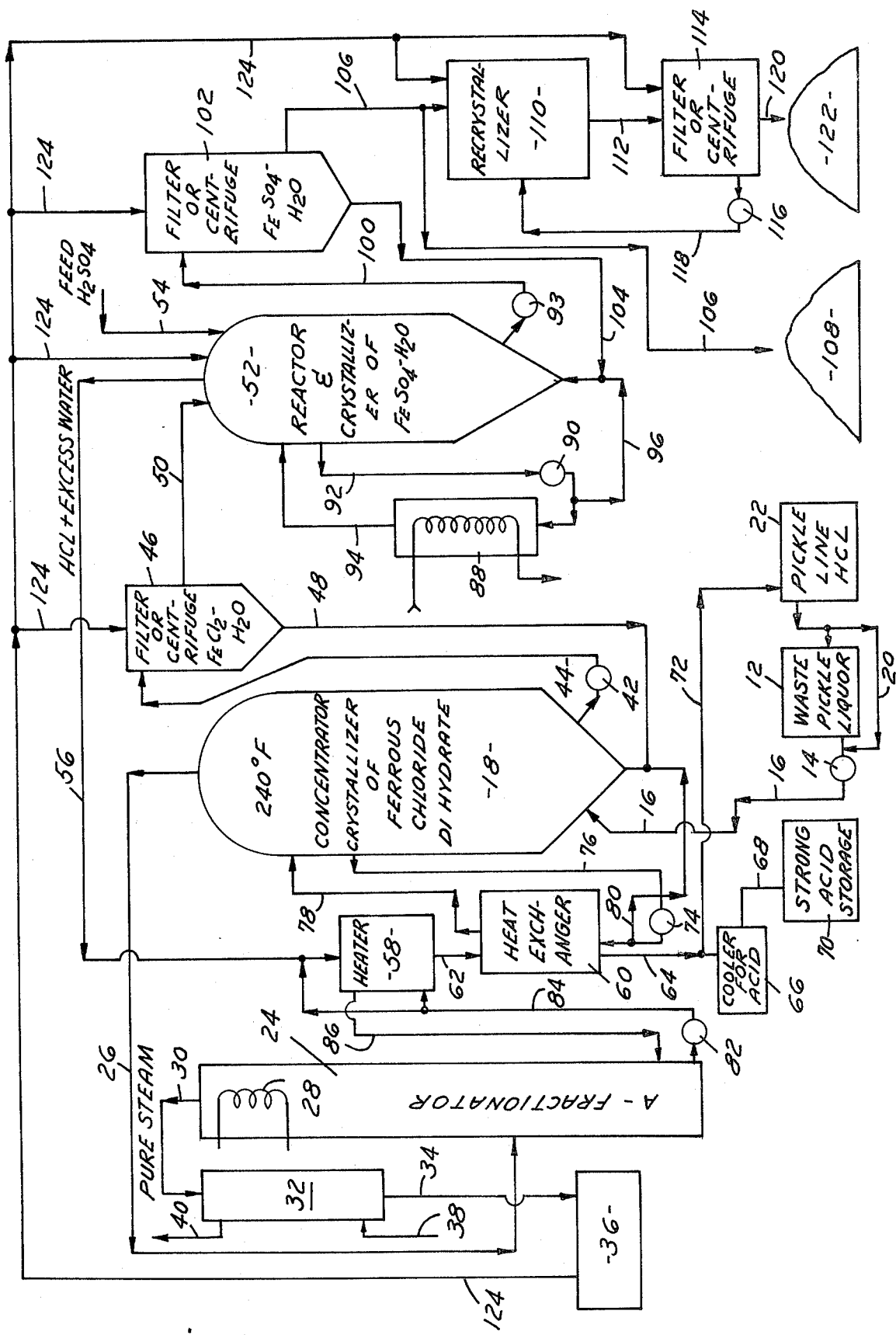

METHOD OF PREPARING HYDROCHLORIC ACID AND HIGH PURITY FERROUS SULFATE HYDRATE CRYSTALS FROM HYDROCHLORIC ACID WASTE PICKLE LIQUOR

BACKGROUND OF THE INVENTION

Processes for recovering hydrochloric acid from waste pickle liquor are known as exemplified by my prior U.S. Pat. No. 4,222,997. The regeneration of hydrochloric acid from waste pickle liquor still remains a problem, however, because the energy costs necessary to operate a recovery process continue to increase. Since the environmental disposal of waste hydrochloric acid pickle liquor also remains a critical factor, new and improved recovery processes are desirable and necessary.

Several of the reasons for recovering hydrochloric acid from waste pickle liquor have been given in my prior patent. Further investigations have shown that it is desirable to produce a stronger acid than that obtained from the process of my earlier patent, namely, greater than 34% HCL. It is also desirable that the recovery process be improved for controlling the quality of the hydrochloric acid as well as varying the concentration thereof. It has been found that a much wider range of hydrochloric acid concentrations can be produced with improved quality.

Waste pickle liquor typically contains 14-25% ferrous chloride, 3-7% hydrogen chloride, and several impurities, including inhibitor residues and trace elements which are picked up during the pickling process by the action of the acid on the steel being pickled. These impurities greatly reduce the use of the ferrous sulfate monohydrate by-product that is produced from the recovery process described in my prior patent. Since high quality ferrous sulfate is used as a food additive and in many commercial chemical processes, it is desirable that a recovery process be provided which will materially improve the quality of the ferrous sulfate monohydrate by-product produced. Further, it is desirable to form hydrates of ferrous sulfate other than the monohydrate sulfate since they are also widely used.

Thus, it is an object of the present invention to recover a stronger hydrochloric acid from the waste pickle liquor and to mix that stronger acid with weaker acid from another part of the process thereby producing controlled variable concentrations of hydrochloric acid. It is another object of the present invention to produce high quality ferrous sulfate crystals in several hydrate forms. A further object of the invention is to reduce the amount of vapor removed from the sulfuric acid reactor by having the primary concentration done at a lower temperature in a ferrous chloride concentrator crystallizer.

SUMMARY OF THE INVENTION

The process of the present invention provides a method for recovering a wide range of hydrochloric acid concentrations from waste pickle liquor containing ferrous chlorode. The process also produces high quality ferrous sulfate by-product in several hydrate forms.

Initially, the waste pickle liquor is concentrated in a concentrator crystallizer by boiling off water and free hydrogen chloride until the ferrous chloride precipitates as a crystalline hydrate. The ferrous chloride crystals are removed from the concentrator crystallizer leaving a substantial amount of the impurities in the mother liquor.

The water and hydrogen chloride vapors from the concentrator crystallizer are directed to an acid vapor fractionator. The fractionator produces an overhead steam line of substantially pure water which is condensed within a heat exchanger and discharged into a storage tank for later use as rinse water for the ferrous sulfate crystal by-product from the process. The bottom liquor in the fractionator will yield 18–20% hydrochloric acid under normal circumstances, although it may be necessary to circulate the fractionator bottoms through a reboiler to obtain hydrochloric acid of 18–20%. The weaker acid from the fractionator may be bled off and stored or mixed with a stonger acid product formed at another stage of the process, as will be described.

The ferrous chloride hydrate crystals which are removed from the concentrator crystallizer are then filtered, washed, and fed to a sulfuric acid reactor. Sulfuric acid is added to the reactor to react with the ferrous chloride crystals thereby forming hydrogen chloride and ferrous sulfate monohydrate. The vapors produced from the reaction, namely, hydrogen chloride and water, are discharged and condensed for producing strong hydrochloric acid product of approximately 80% concentration. Any impurities in the ferrous chloride crystals will tend to dissolve in the reactor mother liquor. The crystallized ferrous sulfate will be improved if washed to remove the mother liquor from the surface of the crystals.

One of the features of the present invention resides in reduction of vapor that must be removed from the sulfuric acid reactor. In the present process, crystals of ferrous chloride are added to the reactor instead of concentrated waste pickle liquor as described in my prior patent. This permits lower heat requirements in the reactor since free hydrogen chloride and water from the waste pickle liquor is removed in the concentrator crystallizer at a lower temperature than would be required in the reactor. Thus, in the reactor, for example, it is only necessary to remove one of the water molecules per molecule of ferrous chloride dihydrate to form the ferrous sulfate monohydrate by-product.

A high quality ferrous sulfate by-product is produced as a result of at least two crystallizations of the ferrous salts. The first crystallization occurs in the concentrator crystallizer producing a hydrate of ferrous chloride. These crystals are then filtered and washed to remove impurities from the mother liquor. A second crystallization occurs in the sulfuric acid reactor with ferrous sulfate monohydrate being formed. The dissolving of ferrous chloride in the reactor further purifies the ferrous sulfate because any soluble occluded impurities in the chloride crystals tend to remain in the sulfuric acid mother liquor.

The ferrous sulfate monohydrate crystals produced in the reactor may be recrystallized to produce higher hydrates of ferrous sulfate if desired. For example, the ferrous sulfate monohydrate by-product may be directed from the reactor to a crystallizer which is operated to form four or seven hydrate ferrous sulfate. This additional crystallization step further improves the quality of the ferrous sulfate product.

When the strong acid (approximately 80% HCL) from the reactor is mixed with the fractionator bottoms (approximately 18–20% HCL), the resulting mixture will yield variable hydrochloric acid concentrations such as, for example, 38–43% concentrations. The process is controllable to produce several desired acid concentrations, depending on market requirements. Thus, a much wider range of hydrochloric acid concentrations is possible with the process of the present invention.

Other advantages and meritorious features of the recovery process of the present invention will be more fully understood from the following description of the invention, the appended claims, and the drawings, a brief description of which follows.

BRIEF DESCRIPTION OF DRAWINGS

The single FIGURE drawing is a flow diagram of the acid recovery and ferrous sulfate purifying system of the present invention.

DETAILED DESCRIPTION OF THE INVENTION

The hydrochloric acid recovery and ferrous sulfate hydrate crystal purifying system of the present invention is illustrated in the single FIGURE drawing. Waste pickle liquor from storage tank 12 is transferred by pump 14 and line 16 into concentrator crystallizer 18. Line 20 from pickle line 22 is fed at a higher level so that pump 14 takes the hotter liquor first if it is available. Water and free hydrogen chloride are boiled off from the waste pickle liquor within concentrator 18 thereby causing ferrous chloride build-up until the ferrous chloride precipitates as a hydrate such as $FeCl_2 2H_2O$.

The water and hydrogen chloride vapors from concentrator crystallizer 18 are directed to the acid vapor fractionator 24 through line 26. The fractionator 24 functions to recover the vapors from concentrator 18. A reflux condensor 28 controls the fractionated column overhead which is maintained essentially free of hydrogen chloride. That is, fractionator 24 produces an overhead steam line 30 of substantially pure water which is condensed within heat exchanger 32. The condensate from heat exchanger 32 is discharged by line 34 into a storage tank 36 to be used as recyclable water. This purified water can be used as rinse water for the various crystals produced from the process, to be discussed hereinafter. Service water is brought into condensor 32 through inlet line 38 and discharged from the condensor through line 40. The service water is preheated within condensor 32 for use as rinse water in pickle line 22.

The ferrous chloride dihydrate crystals produced at the bottom of concentrator crystallizer 18 are transferred by pump 42 through line 44 to filter or centrifuge unit 46. Unit 46 separates the hydrated ferrous chloride crystals from the filtrate which is discharged through line 48 for recycling with the liquor in concentrator 18. The crystals which are removed in the filter unit 46 are conveyed by a screw conveyor or the like through line 50 into reactor 52. Sulfuric acid is added to reactor 52 through line 54 to react with the ferrous chloride crystals from filter 46 to form hydrogen chloride and ferrous sulfate monohydrate. The vapors produced from the reaction, namely, hydrogen chloride and water exit from reactor 52 through line 56.

The hydrogen chloride and water vapors from reactor 52 pass through line 56 into heat exchanger 58 and then through line 62 into heat exchanger 60. The vapors are condensed within heat exchangers 58 and 60 to form hydrochloric acid having a strong concentration of approximately 80% which is discharged from heat exchanger 60 through line 64. The strong hydrochloric acid may be cooled by unit 66 and then transferred by line 68 to a strong hydrochloric acid storage tank 70.

Alternatively, some of the acid vapors may be directed through line 72 to condensors in the pickle line 22 with the heat removed from the vapors being used to heat the pickle line.

Heat exchanger 60 is used to provide secondary concentrating of the pickle liquor in concentrator crystallizer 18 with the main concentrating being done in concentrator crystallizer 18 at a relatively low temperature. The pickle liquor from concentrator crystallizer 18 is circulated through heat exchanger 60 by pump 74 through lines 76 and 78. The hydrogen chloride and water vapors in line 56 from reactor 52 provide a source of heat to exchangers 58 and 60 when the vapors condense as hydrochloric acid. Since the ferrous chloride crystals in concentrator 18 tend to settle, line 76 is positioned relatively high on concentrator 18 for recycling liquor through heat exchanger 60. Further, an optional line 80 may be provided at the discharge end of pump 74 for circulating liquor into the bottom of concentrator 18 thereby preventing an excessive build-up of ferrous chloride crystals in that area.

Heat exchanger 60 and crystallizer 18 could be combined to function as a double effect evaporator crystallizer. This could be used to increase heat efficiency and help in crystal formation and control.

As described, the water and hydrogen chloride vapors from concentrator crystallizer 18 are directed to fractionator 24 through line 26. In the fractionator, the water and hydrogen chloride vapors are separated into two streams. The overhead line 30 is directed to condensor 32 to produce high purity water that is stored in tank 36. The bottom liquor in fractionator 24 will yield 18–20% hydrochloric acid under normal circumstances. In some instances, it may be necessary to operate heat exchanger 58 as a reboiler for the bottoms from fractionator 24 to obtain 18–20% hydrochloric acid. The bottoms from fractionator 24 are directed to reboiler 58 by pump 82 through lines 84 and 86. The weaker hydrochloric acid from fractionator 24 can be bled off and stored or mixed with the strong acid product from reactor 52.

When the strong acid (approximately 80% HCL) from reactor 52 in line 56 is mixed with the fractionator bottoms in line 86, the resulting mixture will yield hydrochloric acid concentrations between 38–43%. Other concentration ranges may be produced, by adding or subtracting wash water, depending on the market requirements. Thus, a much wider range of hydrochloric acid concentrations is possible with the process of the present invention.

Another feature of the present invention resides in the production of high quality ferrous sulfate from reactor 52. As described, the ferrous chloride crystals from concentrator 18 are fed to reactor 52 and reacted with sulfuric acid to form hydrogen chloride and ferrous sulfate. The liquor from reactor 52 is circulated through heat exchanger 88 by means of pump 90 and lines 92 and 94. A predetermined pressure and temperature of steam is directed through exchanger 88 so that the liquor temperature is raised to a flash point when it returns to reactor 52 for removing the HCL and water vapors as previously described. The liquor must be recycled through heat exchanger 88 several times in order to provide the proper amount of evaporation for removing the water and hydrogen chloride vapors. An optional line 96 may be provided at the discharge end of pump 90 for circulating liquor into the bottom of reactor 52 thereby preventing an excessive build-up of ferrous sulfate crystals in that area.

The ferrous sulfate monohydrate crystals produced in reactor 52 are collected in the lower part of reactor 52 for removal as a slurry. The crystals are directed by pump 93 and line 100 to a filter or centrifuge unit 102. The mother liquor which is separated from the ferrous sulfate monohydrate crystals during the filtration process in unit 102 returns to reactor 52 through line 104. The high quality ferrous sulfate monohydrate crystals discharged from filter 102 are directed through line 106 to storage area 108 or to recrystallizer unit 110. Recrystallizer 110 may be operated to form a four or seven hydrate of ferrous sulfate. Line 112 carries a slurry of the four or seven hydrate being prepared in recrystallizer 110 to filter or centrifuge 114, and the mother liquor separated therefrom is returned to recrystallizer 110 by pump 116 through line 118. The four or seven hydrate crystals removed from filtration unit 114 are directed through line 120 to storage area 122.

The purified water stored in tank 36 may be directed through line 124 to be used for washing the ferrous chloride crystals in filter unit 46, for washing the ferrous sulfate crystals in filter 102, or for washing the crystals in filter 114. Further, the water from tank 36 may also be used in reactor 52 if desired or in recrystallizer 110 for raising the hydrate for the ferrous sulfate from one to four or seven.

One of the features of the present invention resides in reduction of vapor that must be removed from the sulfuric acid reactor 52. In the present process, crystals of ferrous chloride dihydrate are added to the reactor instead of concentrated waste pickle liquor as described in my prior U.S. Pat. No. 4,222,997. This permits lower heat requirements in reactor 52 since free hydrogen chloride and water from the waste pickle liquor is removed in concentrator 18 at a lower temperature than would be required in reactor 52. Thus, in reactor 52, it is only necessary to remove one of the water molecules per molecule of ferrous chloride dihydrate to form the ferrous sulfate monohydrate.

As described, free hydrogen chloride is boiled off from the waste pickle liquor in concentrator 18 thereby causing ferrous chloride build-up until the ferrous chloride precipitates as a crystalline hydrate, preferably $FeCl_2 2H_2O$. It is also within the scope of the present process to form other hydrates of ferrous chloride including the four hydrate ferrous chloride.

EXAMPLE 1

The waste pickle liquor of the first example has the following composition: ferrous chloride 18%, free hydrogen chloride 6%, balance water 76%. (Feed is 1,000 gal. of waste pickle liquor taken at 1.22 specific gravity.) This liquor is fed to concentrator crystallizer 18 through line 16 from storage tank 12 or from pickle line 22 through lines 20 and 16. The liquor feed would consist of 1829 pounds of ferrous chloride, 610 pounds of hydrogen chloride, and 7724 pounds of water. In the concentrator 18, the water not used in the formation of ferrous chloride dihydrate crystals and the hydrogen chloride are boiled off to fractionator 24. 7203 pounds of water and 610 pounds of hydrogen chloride would be boiled off through line 26 to fractionator 24.

In fractionator 24, the water vapor and hydrogen chloride vapor are separated into two streams. The overhead line 30 is directed to condensor 32 to produce water which passes to condensed water storage 36. The bottom liquor of fractionator 24 would consist of hydrochloric acid between 18–20% concentration. It may be necessary to operate heat exchanger 58 as a reboiler for the bottom of fractionator column 24 to obtain 18–20% HCL. The bottom acid may be stored or mixed with the stronger acid from reactor 52 as will be described.

The ferrous chloride dihydrate formed in concentrator 18 is removed by circulation of the mother liquor slurry to filter 46 through line 44. The filtered mother liquor is returned to concentrator crystallizer 18 by line 48. In this example, 2349 pounds of ferrous chloride dihydrate is removed from filter 46 and fed to reactor 52 through line 50.

The feed to reactor 52 consists of two streams, ferrous chloride dihydrate of 2349 pounds and sulfuric acid through line 54. If 100% $H_2SO_4$ is fed, 1415 pounds is required; for 96% $H_2SO_4$, 1474 pounds is required; and for common commercial grade sulfuric acid of 93%, 1522 pounds is required. Regardless of the concentration of the sulfuric acid, the ferrous sulfate monohydrate produced is the same for a given value of ferrous chloride dihydrate fed to reactor 52. In this example, 2452 pounds of ferrous sulfate monohydrate is produced and removed to filter 102. The ferrous sulfate monohydrate product may be stored at 108 or routed into crystallizer 110 to form either four hydrate or seven hydrate ferrous sulfate. The product, if four hydrate is produced, would weigh 3232 pounds, whereas if seven hydrate is produced, it would weigh 4012 pounds.

A change in the concentration of sulfuric acid changes the concentration for the vapors of HCL and water in reactor 52. A lower concentration sulfuric acid produces a lower concentration hydrogen chloride vapor in line 56. With 100% $H_2SO_4$, 1313 pounds of 80.2% HCL would be produced and with 96% $H_2SO_4$, 1371 pounds of 76.7% HCL would be produced.

The weak acid of 18–20% concentration from the bottoms of fractionator 24 is mixed through line 84 with the strong hydrochloric acid from reactor 52 through line 56. For 100% $H_2SO_4$, the mixed acid would yield 4367 pounds of 38.1% HCL and for 96% $H_2SO_4$, the mixture would product 4420 pounds of 37.6% HCL.

The ferrous chloride dihydrate fed to reactor 52 weighs 2349 pounds and has 520 pounds of water of hydration. Half of this water reacts to furnish the water of hydration of the ferrous sulfate monohydrate and the other half passes through line 56 along with the HCL formed by the reaction of the ferrous chloride dihydrate and the sulfuric acid.

EXAMPLE 2

The waste pickle liquor of the second example has the following composition: ferrous chloride 24%, hydrogen chloride 6%, balance water 70%. (Feed is 1000 gal. taken at 1.2933 specific gravity.) This liquor is fed to concentrator crystallizer 18 through line 16 from the storage tank 12 or from pickle line 22 through lines 20 and 16. The liquor fed would consist of 2585 pounds of ferrous chloride, 646 pounds of hydrogen chloride, and 7541 pounds of water. In the concentrator 18, the water not used in the formation of ferrous chloride dihydrate crystals and the hydrogen chloride are boiled off to fractionator 24. The vapor from concentrator 18 would contain 6806 pounds of water and 646 pounds of hydrogen chloride. In this example, 3321 pounds of ferrous chloride dihydrate is formed in concentrator 18 containing 735 pounds of water of hydration.

In fractionator 24, the water vapor and hydrogen chloride vapor are separated into two streams. The overhead line 30 is directed to condensor 32 to produce water which passes to condensed water storage 36. The bottom liquor of fractionator 24 could be stored or mixed with the stronger acid from reactor 52. This bottom acid would contain 18–20% HCL and in this example would be 3232 pounds of 20% HCL.

The ferrous chloride dihydrate formed in concentrator 18 is removed by circulation of the mother liquor slurry to filter 46 through line 44. The filtered mother liquor is returned to concentrator crystallizer 18 by line 48. The ferrous chloride dihydrate crystals are then conveyed to the reactor 52 through line 50. In the reactor 52, sulfuric acid reacts with the ferrous chloride dihydrate to form ferrous sulfate monohydrate. One of the water molecules in ferrous chloride dihydrate would account for the water in the ferrous sulfate monohydrate. The hydrogen chloride formed by the reaction will be boiled off through line 56 along with the second water molecule freed by the reaction. When 100% $H_2SO_4$ is used, the vapor in line 56 would contain 368 pounds of water and 1488 pounds of hydrogen chloride. This strong acid product, if condensed, would yield 80.2% HCL. When the strong acid from line 56 is mixed with the fractionator bottom line 84, the acid produced by condensation would weigh 5087 pounds and contain 41.9% HCL. When 96% $H_2SO_4$ is used, the strong acid formed would weigh 1939 pounds and contain 76.7% HCL. The mixed acid formed would result in 5171 pounds of HCL at 41.3%.

The ferrous sulfate monohydrate product of 3465 pounds may be stored at 108 or routed into crystallizer 110 to form either four hydrate or seven hydrate ferrous sulfate. The product, if four hydrate is produced, would weigh 4568 pounds, whereas if seven hydrate is produced, it would weigh 5671 pounds.

EXAMPLE 3

The waste pickle liquor of the third example has the same composition as in Example 2 with 100% $H_2SO_4$ being used in reactor 52. This example will show the versatility of the process including the concentration of acid produced and the ferrous sulfate hydrates produced.

In order to produce a high quality ferrous sulfate monohydrate, washing of the crystals will be required to remove the mother liquor from the surface of the crystals. Because of the strength of the acid which would be produced by the reactor reaction alone (approximately 80.2%), thorough washing of the crystals can be performed without diluting the resulting commercial acid.

In Example 2, when 100% $H_2SO_4$ is used in reactor 52, 1856 pounds of 80.2% HCL is produced. If 35% HCL acid were required, wash water in an amount of 2396 pounds could be used on the crystal wash of ferrous sulfate monohydrate in filter 102. Then, 4252 pounds of 35% HCL would be produced.

If 50% of the fractionator bottom acid were added to make up the mix, 3471 pounds of mixed acid of 52.2% HCL would be produced. Using this acid and dilution by 1705 pounds of wash water in the monohydrate filter 102 would produce 5177 pounds of 35% HCL acid.

If half of the ferrous sulfate monohydrate produced (1733 pounds) were made into $FeSO_4.4H_2O$, 2284 pounds of crystals of that salt would result. When the same amount (1733 pounds) of the monohydrate is added to crystallizer 110 and the seven hydrate ferrous sulfate produced, 2835 pounds of ferrous sulfate hepta hydrate would be filtered from the mother liquor in filter 114 and transferred to storage 122. If the 3466 pounds of ferrous sulfate monohydrate were divided equally, all three hydrates of ferrous sulfate could be produced, as follows: 1522 pounds of $FeSO_4.4H_2O$; 1890 pounds of $FeSO_4.7H_2O$; and 1157 pounds of $FeSO_4.H_2O$.

It will be apparent to those skilled in the art that the foregoing disclosure is exemplary in nature rather than limiting, the invention being limited only by the appended claims.

I claim:

1. A method of recovering hydrochloric acid and high quality ferrous sulfate from waste pickle liquor containing ferrous chloride including the steps of:
   concentrating said waste pickle liquor in a concentrator crystallizer by boiling off water and free hydrogen chloride as vapor until ferrous chloride precipitates as a crystalline hydrate;
   directing said water and hydrogen chloride vapor from said concentrator crystallizer to a fractionator and separating the vapor into high purity water and relatively weak hydrochloric acid product;
   filtering said ferrous chloride crystalline hydrate after it is removed from the concentrator to separate the ferrous chloride crystals from the filtrate;
   directing said filtrate into said concentrator and recycling the filtrate with the liquor in said concentrator;
   directing said ferrous chloride crystals into a reactor;
   reacting said ferrous chloride crystals with sulfuric acid in said reactor to form water and hydrogen chloride vapors and crystalline ferrous sulfate monohydrate;
   condensing the hydrogen chloride and water vapors from said reactor to form a strong hydrochloric acid product; and
   filtering said crystalline ferrous sulfate monohydrate after it leaves said reactor;
   said first mentioned filtering step being provided on said ferrous chloride upstream of said reactor and said second filtering step being provided on said ferrous sulfate downstream of said reactor to reduce the impurities therein.

2. The method of claim 1 including the step of recrystallizing said ferrous sulfate monohydrate to form four hydrate ferrous sulfate crystals.

3. The method of claim 1 including the step of recrystallizing said ferrous sulfate monohydrate to form seven hydrate ferrous sulfate crystals.

4. The method of claim 1 including the step of mixing the weak hydrochloric acid product from the fractionator with the strong hydrochloric acid product from the reactor to form a range of concentrations of hydrochloric acid from 38 percent to 43 percent inclusive.

5. The method of claim 1 including the step of circulating the high purity water separated in the fractionator for use as rinse water for the crystalline ferrous chloride and ferrous sulfate monohydrate.

6. The method of claim 1 including the step of directing the high purity water separated in the fractionator to a recrystallizer for raising the hydrate of the ferrous sulfate from one to four.

7. The method of claim 1 including the step of directing the high purity water separated in the fractionator to a recrystallizer for raising the hydrate of the ferrous sulfate from one to seven.

8. The method of claim 1 including the steps of cycling the ferrous chloride crystalline hydrate through a centrifugal filter and transferring the filtered ferrous chloride crystalline hydrate to said reactor.

9. The method of claim 1 including the steps of condensing the hydrochloric acid and water vapors from the reactor by passing the vapors through first and second heat exchangers connected in series, the first heat exchanger acting as a reboiler for the hydrochloric acid product produced in the fractionator and the second heat exchanger providing additional concentration for the waste pickle liquor in the concentrator crystalizer.

10. The method of recovering hydrochloric acid and high quality ferrous sulfate as defined in claim 1 wherein each filtering step include the step of washing the ferrous chloride and the ferrous sulfate respectively to reduce the impurities therein.

11. The method of recovering hydrochloric acid and high quality ferrous sulfate as defined in claim 1 wherein each filtering step include the step of subjecting the ferrous chloride and the ferrous sulfate to a centifuge respectively to reduce the impurities therein.

* * * * *